United States Patent [19]
Sahouani et al.

[11] Patent Number: 5,867,239
[45] Date of Patent: Feb. 2, 1999

[54] WIDE ANGLE OPTICAL RETARDER

[75] Inventors: Hassan Sahouani; Sundaravel Damodaran, both of St. Paul; Gary T. Boyd, Woodbury; Ramesh C. Kumar, St. Paul, all of Minn.

[73] Assignee: Minnesota Mining and Manufacturing Company

[21] Appl. No.: 953,128

[22] Filed: Oct. 17, 1997

[51] Int. Cl.⁶ .................................................. G02F 1/1335
[52] U.S. Cl. ........................................... 349/117; 349/118
[58] Field of Search ..................................... 349/117, 118

[56] References Cited

U.S. PATENT DOCUMENTS

| | | | |
|---|---|---|---|
| 5,061,042 | 10/1991 | Nakamura et al. | 359/63 |
| 5,138,474 | 8/1992 | Arakawa | 349/120 |
| 5,244,713 | 9/1993 | Nakamura | 428/156 |
| 5,245,456 | 9/1993 | Yoshimi et al. | 359/73 |
| 5,285,303 | 2/1994 | Okada et al. | 349/117 |
| 5,344,916 | 9/1994 | Harris et al. | 349/120 |
| 5,380,459 | 1/1995 | Kanemoto et al. | 252/299.01 |
| 5,396,355 | 3/1995 | Wade et al. | 359/73 |
| 5,474,731 | 12/1995 | Morikawa et al. | 264/230 |
| 5,480,694 | 1/1996 | Harris et al. | 528/353 |
| 5,526,150 | 6/1996 | Mazaki et al. | 359/73 |
| 5,580,950 | 12/1996 | Harris et al. | 528/350 |
| 5,583,679 | 12/1996 | Ito et al. | 349/118 |
| 5,585,950 | 12/1996 | Nishino et al. | 349/118 |

FOREIGN PATENT DOCUMENTS

| | | | |
|---|---|---|---|
| 0 297 841 | 6/1988 | European Pat. Off. . | |
| 0 376 696 | 12/1989 | European Pat. Off. . | |
| 0 783133 A1 | 7/1997 | European Pat. Off. | G03B 21/60 |
| 49082777 A | of 0000 | Japan | G02B 5/30 |
| 53-084906 | 10/1978 | Japan | G02B 5/30 |
| 53-123476 | 10/1978 | Japan | G02B 5/30 |
| 55-084906 | 6/1980 | Japan | G02B 5/30 |
| 55-124118 | 9/1980 | Japan | G02B 5/30 |
| 56-125702 | 10/1981 | Japan | G02B 5/30 |
| 56-125703 | 10/1981 | Japan | G02B 5/30 |
| 56-130701 A | 10/1981 | Japan | G02B 1/08 |
| 56-130702 | 10/1981 | Japan | G02B 1/08 |
| 56-130702 A | 10/1981 | Japan | G02B 5/30 |
| 56-130703 A | 10/1981 | Japan | G02B 5/30 |
| 56-149008 A | 11/1981 | Japan | G02B 5/30 |
| 3072129 | 2/1990 | Japan | G02F 1/1335 |
| 3184704 | 6/1990 | Japan | G02B 5/30 |
| 3-141303 | 6/1991 | Japan | G02B 5/30 |
| 5-196816 A | 8/1993 | Japan | G02B 5/30 |
| 5-196817 A | 8/1993 | Japan | G02B 5/30 |
| 5-196818 A | 8/1993 | Japan | G02B 5/30 |

OTHER PUBLICATIONS

"Orientation in Acrylonitrile Copolymers", S. Kumar and R. Stein, *Journal of Applied Polymer Science*, vol. 27, 3407–3426 (1982).

"Barex 210' A High Nitrile Resin", *Packaging Technology*, pp. 43–47 and 61, Jul. 1972.

"Analysis on Property of Birefrigent Wave–Plate in Cylindrical Convergent Beam", S. Xiao et al., *Jiguang Zazhi/Laser Journal*, vol. 13, No. 3, pp. 138–140, Jun. (1992).

"Analysis on Polarization Aberration of a Birefrigent Wave–Plate in Divergent Bean", G. Li et al., *Guangxue Xuebao/Acta Optica Sinica*, vol. 12, No. 4, pp. 365–360, Apr. 1980.

"Optics in Stratified and Anisotropic Media: 4×4—Matrix Formulation", D. Gerreman, *Journal of the Optical Society of America*, vol. 62, No. 4, pp. 502–510, Apr. 1972.

"High Performance Barrier Resins", Barex—BP Chemicals, *Technical Information Handbook*.

*Primary Examiner*—William L. Sikes
*Assistant Examiner*—Tiep H. Nguyen
*Attorney, Agent, or Firm*—William D. Miller

[57] ABSTRACT

In an acrylonitrile based retarder, relatively uniform performance is obtained as the angle of incidence varies over a wide range. A toughening material may be blended with an acrylonitrile based polymer to facilitate processing of a retarder and improve mechanical properties of the retarder without compromising the optical performance. A rubber-modified acrylonitrile based retarder which provides relatively uniform wide angle can be fabricated using conventional processing techniques. Such retarders are particularly suited for a number of specific applications which use relatively wide ranges of incidence angles.

22 Claims, 13 Drawing Sheets

| Angle (deg.) | Retardance (nm) | Difference (nm) | Percentage |
|---:|---:|---:|---:|
| 80 | -94.12 | -29.78 | 76.0 |
| 70 | -97.15 | -26.75 | 78.4 |
| 60 | -101.63 | -22.27 | 82.0 |
| 50 | -106.87 | -17.03 | 86.3 |
| 40 | -112.18 | -11.72 | 90.5 |
| 30 | -116.95 | -6.95 | 94.4 |
| 20 | -120.70 | -3.20 | 97.4 |
| 10 | -123.08 | -0.82 | 99.3 |
| 0 | -123.90 | 0.00 | 100.0 |
| -10 | -123.08 | -0.82 | 99.3 |
| -20 | -120.70 | -3.20 | 97.4 |
| -30 | -116.95 | -6.95 | 94.4 |
| -40 | -112.18 | -11.72 | 90.5 |
| -50 | -106.87 | -17.03 | 86.3 |
| -60 | -101.63 | -22.27 | 82.0 |
| -70 | -97.15 | -26.75 | 78.4 |
| -80 | -94.12 | -29.78 | 76.0 |

*Fig.2B*

| Angle (deg.) | Retardance (nm) | Difference (nm) | Percentage |
|---:|---:|---:|---:|
| -80 | -87.2 | -27.60 | 76.0 |
| -70 | -90.02 | -24.78 | 78.4 |
| -60 | -94.17 | -20.63 | 82.0 |
| -50 | -99.03 | -15.77 | 86.3 |
| -40 | -103.94 | -10.86 | 90.5 |
| -30 | -108.36 | -6.44 | 94.4 |
| -20 | -111.83 | -2.97 | 97.4 |
| -10 | -114.04 | -0.76 | 99.3 |
| 0 | -114.8 | 0.00 | 100.0 |
| 10 | -114.01 | -0.79 | 99.3 |
| 20 | -111.83 | -2.97 | 97.4 |
| 30 | -108.36 | -6.44 | 94.4 |
| 40 | -103.94 | -10.86 | 90.5 |
| 50 | -99.17 | -15.63 | 86.4 |
| 60 | -94.17 | -20.63 | 82.0 |
| 70 | -90.02 | -24.78 | 78.4 |
| 80 | -87.2 | -27.60 | 76.0 |

*Fig.3A*

| Angle of Incidence (deg.) | ny-nz=0.0000 Retardation (nm) | ny-nz=0.0003 Retardation (nm) | ny-nz=0.0007 Retardation (nm) | ny-nz=0.0009 Retardation (nm) |
|---|---|---|---|---|
| -80 | -87.2 | -73.52 | -55.3 | -46.19 |
| -70 | -90.02 | -77.95 | -61.88 | -53.84 |
| -60 | -94.17 | -84.37 | -71.32 | -64.8 |
| -50 | -99.03 | -91.74 | -82.02 | -77.17 |
| -40 | -103.94 | -99.05 | -92.54 | -89.28 |
| -30 | -108.36 | -105.52 | -101.74 | -99.85 |
| -20 | -111.83 | -110.55 | -108.83 | -107.98 |
| -10 | -114.04 | -113.72 | -113.28 | -113.07 |
| 0 | -114.8 | -114.8 | -114.8 | -114.8 |
| 10 | -114.01 | -113.72 | -113.28 | -113.07 |
| 20 | -111.83 | -110.55 | -108.83 | -107.98 |
| 30 | -108.36 | -105.52 | -101.74 | -99.85 |
| 40 | -103.94 | -99.05 | -92.54 | -89.28 |
| 50 | -99.17 | -91.74 | -82.02 | -77.17 |
| 60 | -94.17 | -84.37 | -71.32 | -64.8 |
| 70 | -90.02 | -77.95 | -61.88 | -53.84 |
| 80 | -87.2 | -73.52 | -55.3 | -46.19 |

Columns labeled: 401, 403, 405, 407

Fig. 4A

WIDE ANGLE OPTICAL RETARDER

BACKGROUND

This invention relates generally to an optical retarder, and more particularly to an optical retarder operable over a wide range of incidence angles.

Optical retarders are generally used in some manner to alter the relative phase of polarized light passing through the retarder. Optical retarders are particularly suited for use in applications where control over the polarization is required. Polarization of light generally refers to the restriction of electric (or magnetic) field vector vibrations to a single plane. The polarization direction of electromagnetic radiation is generally considered the direction in which the electric field vector oscillates back and forth. The polarization vector is orthogonal to the beam direction within the light plane.

Polarized light can assume a number of different forms. Where a light beam oscillates in only one direction at a given point the beam is said to be linearly (or plane) polarized. The direction of oscillation is the polarization direction. If the light beam has two orthogonal polarization directions which vary in phase by 90°, the beam is said to be elliptical or circularly polarized. Circular polarization occurs when the magnitude of the two oscillations are equal (i.e., the tip of the electric field vector moves in a circle). Elliptical polarization occurs when the magnitudes are not equal (i.e., the tip of the electric field vector moves in a ellipse). In contrast, the orthogonal oscillations for unpolarized light are on average equal with a randomly varying phase difference.

Linearly polarized light can be obtained by removing all waves from an unpolarized light beam except those whose electric field oscillate in a single plane. Optical retarders can be used, for example, to convert linearly polarized light to circular or elliptically polarized light. When used to control the polarization of light, retarders are commonly constructed to induce ½- and ¼-wave retardations. Generally, such retarders are used to produce a desired relative phase delay between two linear components of the polarized light.

One typical use of an optical retarder is a compensator which is used to introduce a phase delay in incident light to correct for phase differences between two components of polarized light introduced by mechanical or optical displacement of other optical components in a system. In a liquid crystal display (LCD), for example, birefringence of a liquid crystal cell may cause the linearly polarized light to become slightly elliptical. A retarder is used to convert the elliptically polarized light back to linearly polarized light. The compensating retarder is placed in the light path and is tuned to a particular phase difference introduced by the birefringence of the liquid crystal.

Typical optical retarders are constructed of birefringent materials. The birefringent materials form a fast and slow path along two orthogonal in-plane axes of the retarder. When the axes of the birefringent retarder are aligned at 45° degrees to the polarization direction of the incident light, the retarder can be used to introduce or compensate for phase differences between two polarization components. The fast and slow path of the birefringent retarder results from different refractive indices for light polarized along the in-plane axes of the retarder. Larger retardation differences between the two polarization axes are achieved by increasing the refractive indices difference between the two in-plane axes and/or increasing the thickness of the retarder. Thus, by controlling the thickness and refractive indices of the birefringent material in the retarder, the optical properties of the retarder can be controlled.

In addition to refractive indices for light polarized along the in-plane axes of the retarder, the refractive index for light polarized in the thickness direction may influence the performance of the retarder in a given application. Compensators used in LCD display technology, for example, must provide relatively uniform retardation of light which is incident on the compensator over a relatively large angle range. It has been proposed that widened viewing angle ranges for LCD displays are obtainable by employing retardation films which have controlled refractive indices for light polarized in the thickness direction.

Current attempts to produce retarders having uniform wide angle performance have proven to be expensive and difficult to manufacture and have only achieved limited success in obtaining uniform wide angle optical properties. Attempts to obtain uniform wide angle performance are varied and include, for example, shrinking the film in the direction perpendicular to the stretching direction at the time of stretching, controlling, by stretching, the birefringence of a raw film produced from a molten polymer or a polymer solution under an applied electric field, laminating a film produced under an electric field onto a conventional phase retarder, and the like. Such processes are typically quite complex and expensive and achieve only limited success. As the process and materials used in forming the birefringent portion of a retarder become more complex, it becomes increasingly difficult to incorporate such material into the retarder.

SUMMARY

Generally, the present invention relates to optical retarders. In one embodiment, an optical retarder is provided which uniformly retards light incident on the retarder over a relatively wide range of incidence angles varying from an angle normal to a plane of the retarder to a maximum angle of at least about 30 degrees. The optical retarder can include a substrate and a blended film of an acrylonitrile based polymer and elastomeric copolymer disposed on the substrate. The magnitude of retardation varies by less than about 25% of the normal angle incidence retardation as the angle of incidence varies from normal incidence to incidence at the maximum angle. In one embodiment the maximum angle may be greater than about 60 degrees. When the maximum angle is smaller the variance in retardation may be less.

In another embodiment, an acrylonitrile based retarder mirror is provided. Linearly polarized light reflected by the retarder mirror is rotated to a substantially orthogonal linear polarization. The rotation of the polarization orientation is relatively uniform over a relatively wide range of incidence angles onto the retarder mirror. In another embodiment, an anti-reflective optical construct includes an acrylonitrile based retarder to improve off-normal angular performance of the anti-reflective construct.

The above summary of the present invention is not intended to describe each illustrated embodiment or every implementation of the present invention. The figures and the detailed description which follow more particularly exemplify various embodiments.

BRIEF DESCRIPTION OF THE DRAWINGS

The invention may be more completely understood in consideration of the following detailed description of various embodiments of the invention in connection with the accompanying drawings, in which:

FIGS. 2A–2C illustrate characteristics of a retarder in accordance with an embodiment of the invention;

FIGS. 3A–3C illustrate characteristics of a retarder in accordance with an embodiment of the invention;

FIGS. 4A–4B illustrate characteristics of a retarder in accordance with an embodiment of the invention;

DETAILED DESCRIPTION

The present invention is applicable to a number of optical retarders. The present invention is particularly suited to optical retarders used in environments where the light to be retarded is incident on the retarder over a relatively wide range of incidence angles. Such a retarder is well suited for use as optical compensators, ½-wave and ¼-wave retarders, and the like. To facilitate explanation of the invention, various examples of such retarders are provided below.

Figure 1A:
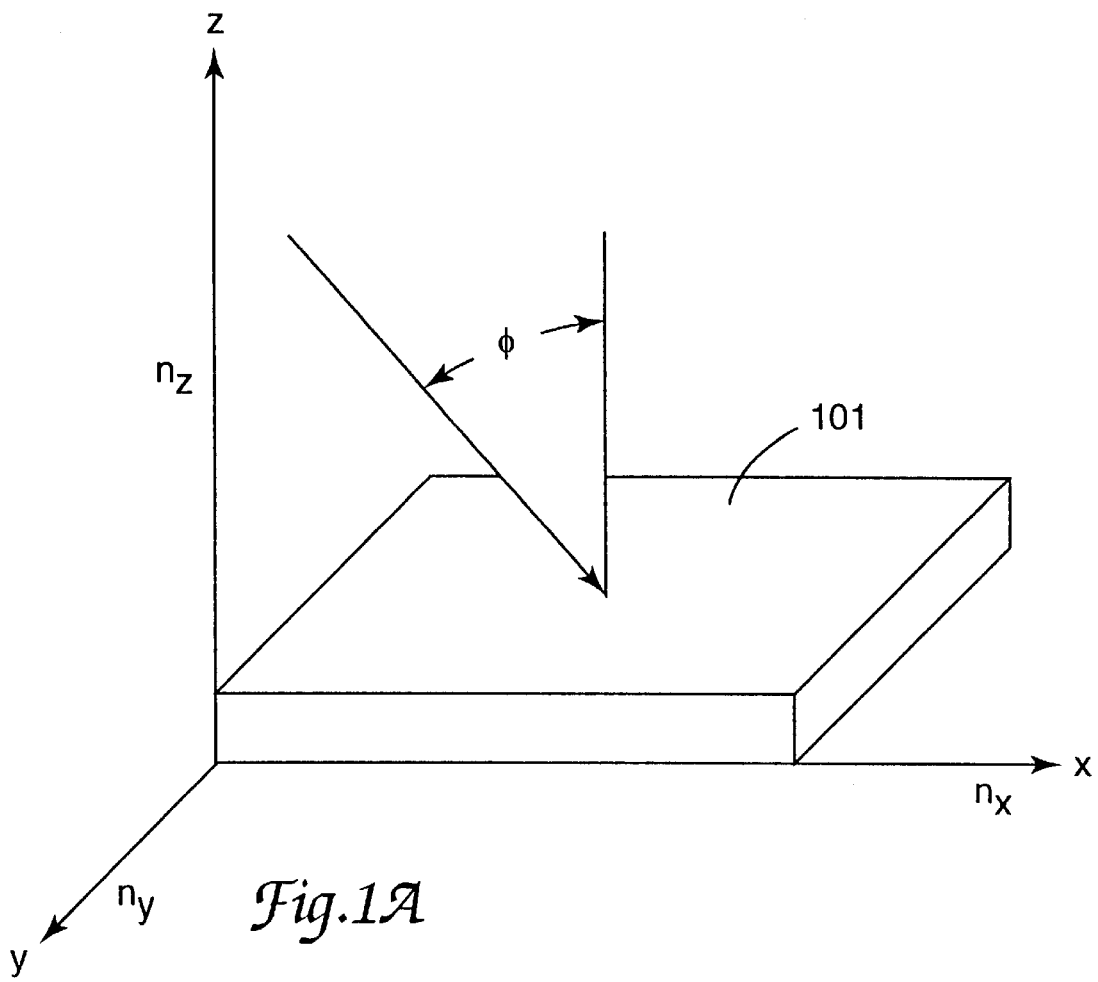
FIGS. 1A–1B illustrate a retarder in accordance with one embodiment of the invention.
Figure 1B:
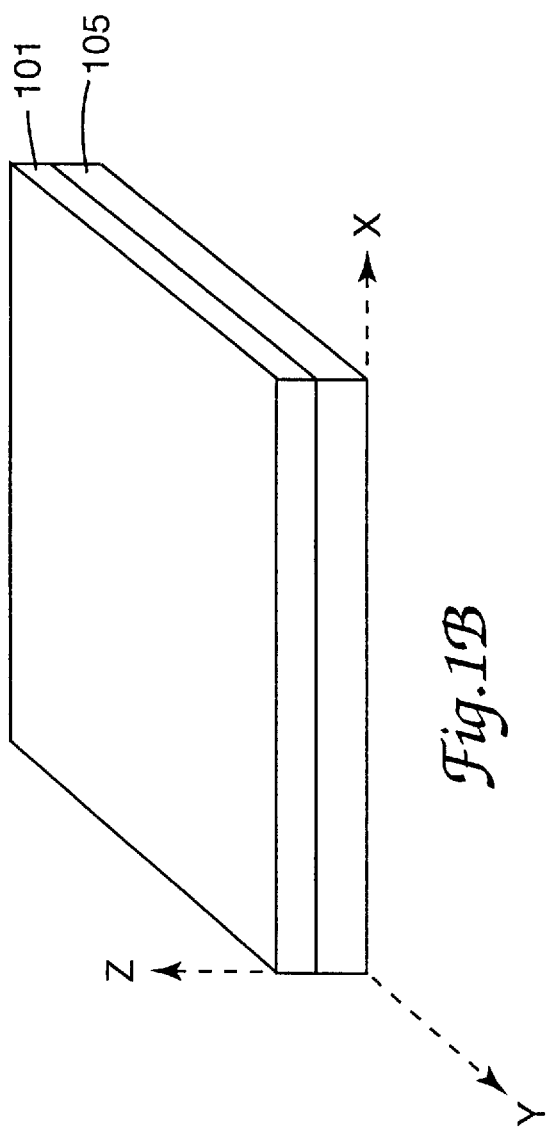

An optical retarder in accordance with one particular embodiment of the invention will be described in connection with FIG. 1A. The optical retarder 101 in FIG. 1A is formed of an acrylonitrile based polymeric film. The film can be described by three mutually orthogonal axes, namely, two in-plane axes x and y and third axis z in the thickness direction of the film. As illustrated in FIG. 1B, the acrylonitrile based retardation film 101 illustrated in FIG. 1A can be disposed on a substrate 105. The substrate 105 may serve a variety of purposes. For example the substrate may be optically neutral, such as glass, and be used mainly for its mechanical properties and/or as a basis for affixing the retardation film 101 to other optical elements. The substrate may also serve one or more optical functions. For example, the substrate may be a mirror, a polarizer, or the like, where the retardation film functions as an optical retarder in a larger optical construction. The substrate may also be a polymeric film. The polymeric film may be isotropic or may be birefringent (in-plane or out-of-plane) to act in cooperation with the optical performance of the acrylonitrile based retarder to obtain a desired overall optical performance. The film may also be combined with a compensator film to improve optical performance.

Generally, the retardation film 101 can be used in connection with any suitable substrate 105. The retardation film 101 may be laminated to the substrate, affixed with an adhesive, or otherwise suitably disposed on the substrate. Care should be taken to ensure that the process and manner used to dispose the retardation film 101 on the substrate 105 does not adversely affect the optical performance of the ultimate retarder construction.

As described more fully below, it has been determined in connection with the present invention that the acrylonitrile based retardation film is particularly suited for use in applications where it is desirable to have relatively uniform retardation of light incident on the retarder over a wide range of angles. Referring again to FIG. 1A, the retardation and angular performance of the retarder 101 are a function of the thickness d of the film and the relative refractive indices $n_x$, $n_y$ and $n_z$ of the film for light polarized in the direction of the x, y and z axes, respectively. Birefringence along the in-plane axes, for example, creates short and long paths for polarized light incident on the film. Generally, the light is incident on the film with the polarization direction aligned at an angle of 45° to the axes of the in-plane refractive indices.

The retardation of the film is defined generally as the phase difference introduced between the linear components of polarized light $E_p$ and $E_s$ aligned along directions parallel (p) and perpendicularly (s) to the plane of incidence. In an ideal ¼-wave retarder, for example, light polarized along one axis (i.e., the component of the polarized light along the axis) is delayed, relative to light polarized along the other in-plane axis, by one-quarter of its wavelength. When the polarized light is initially linearly polarized, the two components are either in-phase or 180° out-of-phase (i.e., the phase difference is equal to 0 or $\pi$ radians). When linearly polarized light passes through a ¼-wave retarder, a phase difference of $\pi/2$ radians is introduced between the two components. The total phase difference between the two components $E_p$ and $E_s$ is now $\pi/2$ or $3\pi/2$ radians. In this manner, a ¼-wave retarder can be used to convert between linearly polarized light and circularly polarized light.

When light is incident on the retarder at an angle normal to the plane of the retarder, the retardation is a function of the thickness of the film and difference in the in-plane refractive indices $n_y$ and $n_x$. As the angle of incidence deviates from normal incidence, the retardation of light passing through the retarder is also influenced by the refractive index $n_z$ for light polarized in the thickness direction z of the retarder. The off-normal performance of a given retarder can be considered by comparing the magnitude of retardation at normal incidence with the magnitude of retardation for incident light which varies from normal incidence.

For a given retarder having known refractive indices, the relative magnitude of retardation at different angles can be examined using the relationship $$\delta = d \left[ \frac{n_x}{n_z} (n_z^2 - (\sin(\phi))^2)^{1/2} - (n_y^2 - (\sin(\phi))^2)^{1/2} \right], \quad (1)$$

where $\delta$ is the magnitude of retardation between the s and p fields, d is the thickness of the film, $n_x$, $n_y$ and $n_z$ are the respective refractive indices of the film for light of a given wavelength, and $\phi$ is the angle of incidence in the x-z plane (measured from an axis normal to the plane of the film). Thus, the magnitude of the retardation in equation (1) represents the difference in delay experienced by s- and p-polarized light components of the incident light, as the incident light passes through the retarder, as a function of incidence angle in the x-z plane. It should be appreciated that equation (1) is provided as one way of expressing the retardation. A similar expression can be derived to express the retardation for light as a function of light varying in other planes (e.g., y-z plane).

In the above relationship, when light is incident on the film at a direction normal to the film (i.e., $\phi=0$), the magnitude of retardation $\delta$ reduces to a function of the thickness d and the in-plane refractive indices difference described by the relationship $$\delta = d(n_x - n_y). \quad (2)$$

Thus, a desired retardation for light of normal angle incidence can be obtain by controlling the thickness of the film and the in-plane refractive indices. Higher retardation can be obtained by increasing the difference between $n_x$ and $n_y$ and/or by increasing the thickness.

The amount of retardation desired depends generally on the particular application for which the retarder will be used and the wavelength of light to be retarded. Typical ¼-wave retarders, for example, have retardation values ranging from about 115 nm to about 158 nm. Typical ½-wave retarders have retardation values ranging from about 230 nm to about 316 nm. Full wave retarders could also be used to simply shift the phase of the two components by $2\pi$ radians. There are a number of applications particularly suited for acrylonitrile based retarders having retardation values ranging from 115 nm to 158 nm. Unless otherwise noted, in the discussion set forth below light having a wavelength of about 550 nm (the approximate center wavelength of visible light) is used to characterize the performance of the retarder. While such light is appropriately used as a means for characterizing the retarder, it should be appreciated that the retarder may be used to retard light over the full visible range or at any particular wavelengths or wavelength bands thereof.

The difference between retardation of light incident at the normal angle and the retardation of light deviated from normal (off-normal) can be used to determine the appropriateness of the optical retarder for use in applications where light is incidence on the retarder over a wide range of angles varying from normal to a maximum off-normal angle. As described more fully below, the acrylonitrile based retarder provides exceptional off-normal optical performance.

Generally, birefringence is induced in a polymeric material by stretching or drawing the material. As the material is stretched, molecules tend to align in the stretched direction. The induced molecular orientation creates refractive index differences for light polarized in the stretched and non-stretched directions. Stretching polymeric films not only induces a change in the refractive index for light polarized in the stretch direction but may also induce changes in the non-stretch and thickness directions. Under typical draw conditions using a tenter, for example, the changes in refractive indices for light polarized in the non-stretched and thickness direction are often quite different. As a result, as a film is stretched to obtain a desired in-plane refractive index mismatch, the thickness direction refractive index may not match either of the in-plane refractive indices. While such a change may not impact the performance of retarders used with normal incident light, the change can significantly impact the retarders performance when retarding off-normal incident light, especially where relatively large angles are used.

From equation (1) it can be determined that improved off-normal performance is obtained when the refractive index $n_z$ for light polarized in the thickness direction is between the in-plane refractive indices $n_y$ and $n_x$. Under typical drawing conditions, however, the thickness direction refractive index $n_z$ of a drawn polymeric film does not fall between the in-plane refractive indices $n_y$ and $n_x$. In accordance with the present invention, when acrylonitrile based polymers are stretched a desired mismatch can be obtained between the in-plane refractive indices while maintaining substantially equal refractive indices for light polarized in the non-stretched and thickness directions. Moreover, closely matched $n_y$ and $n_z$ refractive indices are obtained even when the film is drawn in a manner which constrains dimensional reduction in the non-stretched direction (e.g., when the film is stretched using a conventional tenter process).

As will be appreciated from equation (1), as the angle of incidence increases, the amount of retardation changes. In the acrylonitrile based retarders of the present invention, the magnitude of the change in retardation is significantly reduced as a result of the substantially equal refractive indices (e.g., $n_y$ and $n_z$). In contrast, a typical birefringent polymer such as polypropylene, for example, when stretched in a conventional tenter exhibits a mismatch in the non-stretched and thickness direction refractive indices on the order of 0.009. As a result of this mismatch, the off-normal performance of such a retarder is significantly impaired when compared to an acrylonitrile based retarder.

While an acrylonitrile based retarding film can be used in retarder applications using normal and near normal incident light, such a retarder is particularly suited for use in applications where the incident light varies from normal incidence to an off-normal angle of incidence of at least about 30°. In such applications, using an acrylonitrile based retarder permits one to obtain a difference in retardation between the normal and off-normal incident light which is less than 15% of the normal incidence retardation, and is more preferably less than 10% and even more preferably less than about 6%. As the off-normal angle of incidence increases the retardation difference also increases. However, at off-normal angles as high as 60°, the retardation difference of the acrylonitrile based retarder is less than 30% of the normal incidence retardation, and is more preferably less than about 25% and even more preferably less than about 20%. An acrylonitrile based retarder may also be used to get uniform retardance at lower angles of incidence. For example, advantages are obtained when the maximum off-normal angle is at least about 15° or even less. Exemplary embodiments of acrylonitrile based retarders are provided below.

As noted above, fabrication techniques suggested and used for the production of wide angle retarders are complex and expensive. Such techniques often involve steps of laminating multiple materials together, stretching birefringent materials using highly specialized equipment to artificially control the respective refractive indices, and the like. In contrast, in one embodiment of the invention, an acrylonitrile based retarder can be fabricated using standard processing equipment, such as a tenter for stretching, with little or no modification. Thus, significant cost savings can be achieved. Moreover, the process facilitates a high yield further reducing the costs of producing acrylonitrile based retarders.

One acrylonitrile based film found to be particularly suited for optical retarders is a blend of an acrylonitrile phase and a toughening phase. An elastomeric (rubbery) copolymer, for example, may be used as a toughener in the blend. A number of advantages are obtained by the addition of a toughening phase. For example, the resultant film will have an increased resistance to impact and the film is rendered more flexible and exhibits enhanced resistance to cracking, splitting and tearing. The elastomeric phase may also enhance the drawability.

The addition of a toughening phase, however, must also be taken into account in the formation of the optical retarder. As described more fully below, in accordance with one embodiment an acrylonitrile based polymer and elastomeric copolymer blend is uniaxially stretched to obtain the desired birefringence and thickness of the retarder. Because the acrylonitrile polymer and the elastomeric copolymer are oppositely birefringent in relation to the imposed strain, the strain-induced change in the refractive index of the elastomeric phase reduces the overall retardation of the stretched film. Thus, blended acrylonitrile based films including a elastomeric copolymer must be made thicker than acrylonitrile based films without the elastomeric copolymer in order to obtain the same overall retardation. Increased thickness, however, increases overall absorption and off-normal retardation. These can lead to reduced transmitted intensities and/or off-normal color variations, both of which may be detrimental to many retardation applications. Increased thickness may also be desirable in certain instances to improve film handling and processing (e.g., thicker film may be more easily laminated).

Depending on the application, different amounts of the toughening copolymer may be added to the blend. In general, a balance must be struck between competing interests. For example, the amount of toughener used must be weighed against the increased thickness required to obtain a desired retardation. Generally, where an elastomeric copolymer is used, it is desirable that the elastomeric phase be less than about 18%–20% by weight. Where relatively high transmission is required it is desirable that the elastomeric phase be less than about 15% and even more preferably less than about 10%, and still even more preferably, less than about 5%.

When using a toughener, other optical properties of the toughener must also be considered. It is generally desirable that the refractive indices of the acrylonitrile based polymer and the toughener be relatively close. This is important to minimize diffuse scattering and reflection of the light passing through the retarder as it interacts with the different phases. In the above example, relatively close matching can be obtained by matching the isotropic refractive indices prior to stretching of the acrylonitrile based polymer and the elastomeric copolymer. While this may not produce an exact match in the stretched film, due to different changes in the refractive indices during stretching, the indices are close enough for many applications. It also may be possible to select materials, composition and initial refractive indices such that in the process of orientation the refractive indices of the two phases approach one another further reducing or eliminating hazing in the stretched film.

To facilitate an understanding of the present invention, exemplary retarders comprised of an acrylonitrile based polymer/elastomeric copolymer blend will be described. While the examples below describe a process in which a web is cast and then oriented in the transverse direction using a tenter, any of a number of other typical film processing techniques could be used. For example, the polymer may be extrusion-cast or solvent-cast. Webs may be cast on to an open-faced wheel or into a nip. Orientation may be affected in a variety of ways. For example, the film may be stretched uniaxially (machine or transverse direction) or biaxially using typical machine-direction orienters and/or tenters (e.g., mechanical and linear-motor). The film may also be oriented using a blown-film (e.g., single- and double-bubble) process, by calendering in a nip, by stretching the molten polymer into a web prior to cooling, and the like.

In one particular embodiment, the retarders are fabricated using rubber-modified, acrylonitrile-methyl acrylate copolymers (72–99.5% copolymer, 18–0.5% elastomeric phase). The acrylonitrile-methyl acrylate copolymer composition ranges from 70–100% acrylonitrile and 30–0% methyl acrylate. The elastomeric phase contains from 70–90% butadiene with 30–10% acrylonitrile. Rubber-modified, acrylonitrile-methyl acrylate copolymers having 10% and 18% elastomeric phases are available from BP Chemicals (Barex® 210 and 218).

While the example provided herein use acrylonitrile copolymerized with methyl acrylate, other types of acrylonitrile based polymers may be used. For example, suitable copolymers containing acrylonitrile can obtained by copolymerizing acrylonitrile with a variety of (meth)acrylate monomers which have glass transition temperatures (Tg) which is less than about 20° C. Such (meth)acrylate monomers include, for example, methyl acrylate, propyl acrylate, butyl acrylate, isooctyl acrylate, and 2-ethyl hexyl acrylate or a mixture of such monomers.

In accordance with one embodiment of the invention, rubber-modified acrylonitrile based optical retarders were fabricated. The retarders were acrylonitrile based compositions having an elastomeric phase of either 10% or 18%. The copolymer phase composition was 75% acrylonitrile and 25% methyl acrylate. The elastomeric phase contained 70% butadiene and 30% acrylonitrile. As noted above, the inclusion of the elastomeric phase provides toughness to the composition. The compositions of the two phases (copolymer and butadiene-based elastomeric phase) are selected to obtain closely matched refractive indices. Such compositions are available from BP Chemicals (Barex® 210 and 218) in extrusion and injection molding grades. The Barex® family of acrylonitrile resins are typically used to form high gas barrier packing materials and the like.

Webs of the above compositions were cast with an initial thickness ranging from 254–355 $\mu$m. The cast webs were processed to obtain target retardation values of approximately 100–140 nm. The cast webs were drawn uniaxially in a tenter. Draw temperatures for such films generally range from about 25° C. to 120° C. The draw temperatures are more preferably between about 90° C. and 110° C., and even more preferably between about 90° C. and 105° C. Draw ratios for such a process range from approximately 1.5:1 to 5.0:1. The draw ratios are more preferably between about 2.0:1 and 5.0:1, and even more preferably between about 2.5:1 and 4.0:1. Appropriate draw rates range from about 1% to 3000% per second. The draw rates are more preferably between about 5% and 1000% per second, and even more preferably between about 10% and 200% per second.

When using the 10% elastomeric composition, optical retardation films ranging in thickness from 63–115 $\mu$m were produced which offered the targeted retardation ranges. The films also exhibited minimal off-normal coloration. The transmission intensity of such films exceeded 92%.

When using the 18% elastomeric compositions, it was apparent that the target retardation values could only be obtained with significantly thicker initial webs to increase the drawn thickness (e.g., 254–635 $\mu$m). Thus, retarders comprised of an 18% elastomeric phase exhibit reduced transmission and worse off-normal performance. An optimum concentration of the elastomeric phase appears to be between 5–10%. Such concentrations are believed to strike an optimum balance where relatively high retardation values and light transmission were required. As described more fully below, a retarder manufactured from a composition including about 10% of the elastomeric phase can be fabricated in a relatively inexpensive manner and has relatively uniform performance over a wide range of incidence angles.

As noted above, the inclusion of a toughener, such as an elastomeric phase, in the acrylonitrile based composition tends to reduce the ability to induce a desired birefringence in the film by stretching. In a typical tenter process, because the film must be stretched in many instances near its breaking point to obtain the desired retardation, it is desirable that the initial web be substantially free of orientation in the machine direction prior to stretching. This is because initial orientation in the non-stretched direction must be overcome during the tenter operation before the desired orientation in the stretched direction can be obtained. Drawing 10% rubber-modified acrylonitrile based webs in a tenter to obtain highly transmissive ¼-wave retarders, for example, typically requires that the pre-stretched webs be free from any orientation in the machine direction. Thus, it is desirable that the cast webs must be initially cast in a manner which minimizes, or in certain instances eliminates, unintentional or residual molecular orientation in the machine direction.

In certain instances, the film may be drawn in the direction of an initial orientation which relaxes the requirement for the casting process. For example, the film may be cast and then drawn in the machine direction using a length orienter (LO). Such an LO process may take advantage of the initial machine direction. In fact, in such a case a machine direction orientation may be purposefully induced during casting to assist the formation of the desired birefringence. Other orientation processes could also be used. For example, machine direction orientation may be induced in the molten polymer after it exits the die and prior to solidification. In general, it is desirable that prior to stretching the film have no substantial orientation in the non-stretch direction, regardless of the manner and/or direction in which the film is stretched.

While cast webs of uniform thickness are described above, the thickness of the cast web may also be altered. As noted above, retardation is a function of the retarder thickness. Thus, retarder films having a varying retardation profile across the film may be produced by controlling the casting process to create thickness differences at different points on the web.

The cast web of the present invention may be drawn in a direction orthogonal to the cast direction using a conventional tenter. The draw temperature, rate and ratio are selected to induce a desired refractive index differential between in-plane refractive indices of the drawn web. In this manner, a desired retardation $\delta$ is obtained according to the relationship $\delta=d(n_x-n_y)$, while substantially matching the refractive index of the drawn web for light polarized in the non-drawn and thickness directions. The off-normal retardation can be determined from Equation (1) (with $n_y$ and $n_z$ being substantially equal).

Figure 2A:
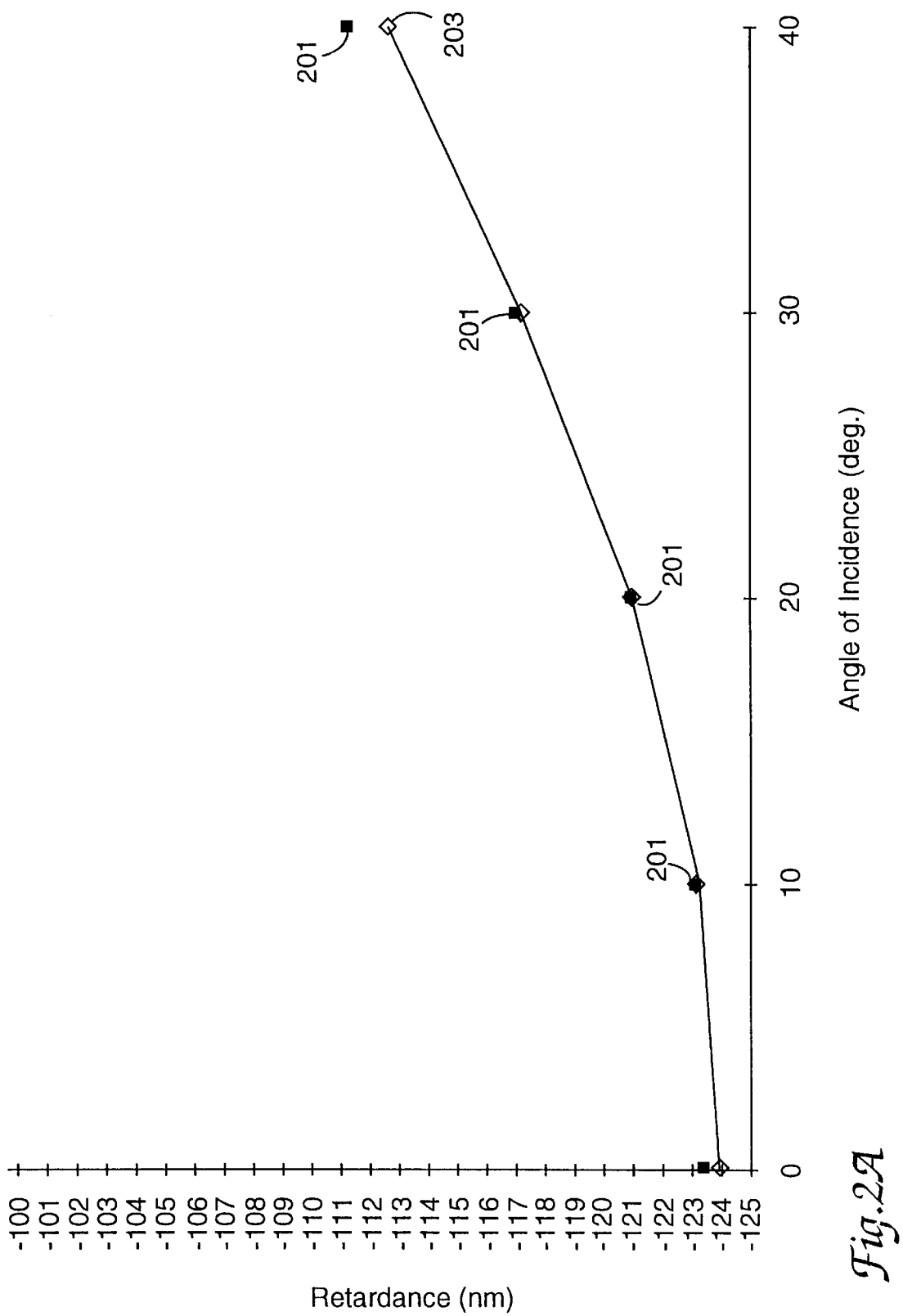
Figure 2C:
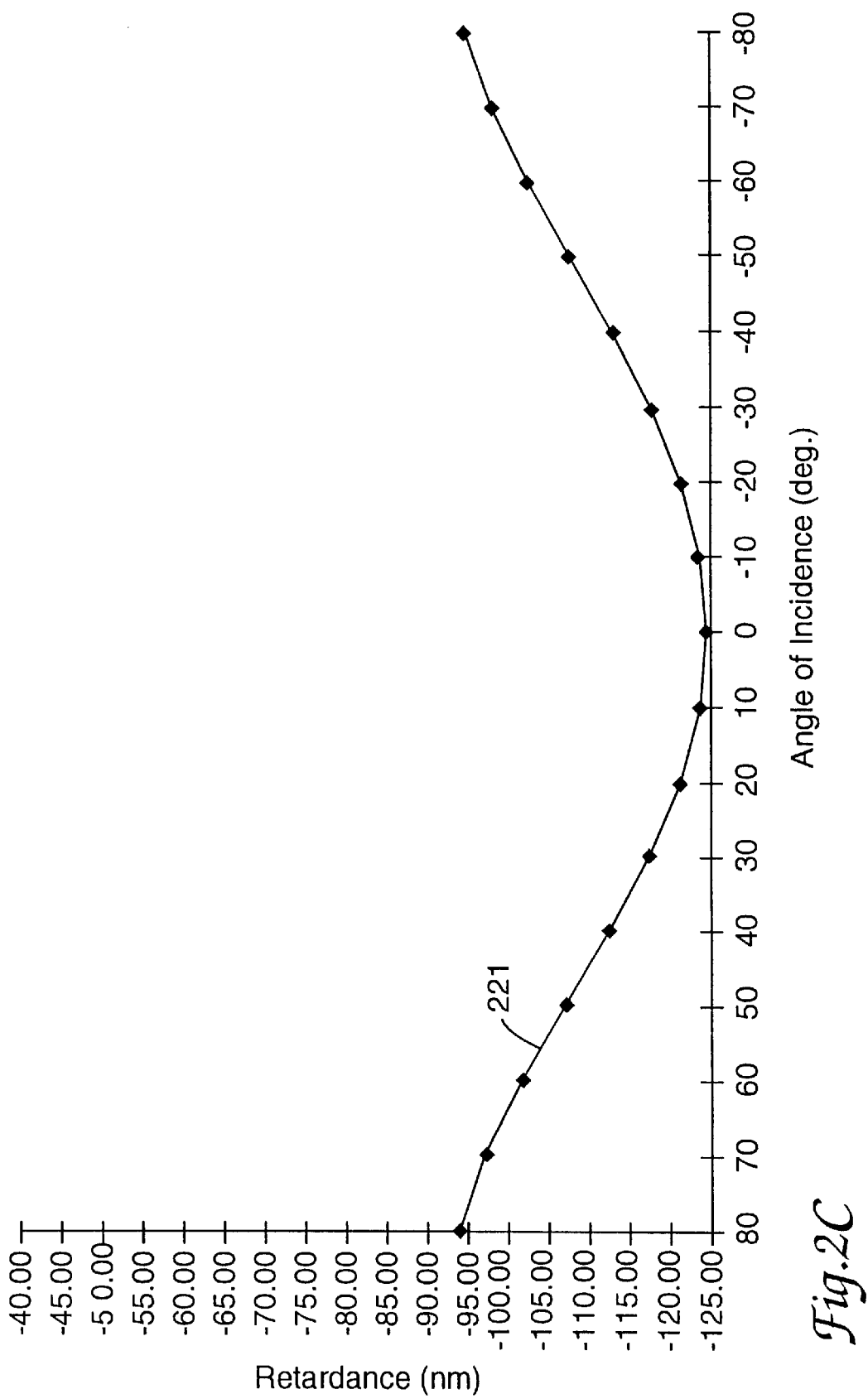

FIGS. 2A–2C illustrate various optical properties of acrylonitrile based retarders in accordance with the present invention. Using the above general process, a transparent acrylonitrile based retarder film was obtained. A 10% rubber-modified acrylonitrile-methyl acrylate 312 $\mu$m thick extruded web was used in which the initial isotropy was substantially preserved in its formation. The web was uniaxially stretched to 3 times its original width in the cross direction. The drawing temperature was about 90° C. The resulting film was approximately 88.5 $\mu$m thick with refractive indices for 550 nm light polarized in the stretched direction of 1.5128 ($n_x$) and 1.5142 for 550 nm light polarized in both the non-stretched and thickness directions ($n_y$ and $n_z$, respectively).

The retardation values for the above film were measured and compared with the retardation values determined using equation (1). FIG. 2A illustrates a comparison of the measured retardation values 201 and the retardation values derived from the measured refractive indices using equation (1) for the film at normal, 10°, 30° and 40° angles of incidence. The difference in retardation as the angle of incidence increases from normal to 40 degree is approximately 10% (13 nm) of normal incidence retardation. In contrast, a polypropylene film having a similar normal angle retardation will vary by approximately 50% (60 nm) at a 40° angle of incidence. Retardation of a polystyrene film drops by nearly 80% (100 nm) for light incident at 40° off-normal, while having acceptable retardation performance at normal angle incidence.

Using equation (1), the retardation difference as the incident light moves from normal incidence for the above film was determined. FIG. 2B lists the retardation values (nm) of the film at different angles of incidence 211, the change in retardation as the incident light moves off-normal 213, and the retardation at the respective incident angles as a percentage of retardation at the normal angle incidence. FIG. 2C illustrates a plot of the retardation values (nm) of the film as a function of incidence angles.

A second acrylonitrile based retarder film was produced by uniaxially stretching a 317.5 $\mu$m thick optically isotropic extruded film to 4 times its original width in the cross direction at a temperature of 95° C. The resulting film was approximately 84 $\mu$m. The refractive indices for light polarized along each direction, with $n_x$ being the refractive index for light polarized in the stretched direction, were measured for light at 488 nm, 550 nm and 700 nm as follows:

|  | 488 nm | 550 nm | 700 nm |
| --- | --- | --- | --- |
| $n_x$ | 1.5162 | 1.5124 | 1.5055 |
| $n_y$ | 1.5175 | 1.5139 | 1.5066 |
| $n_z$ | 1.5174 | 1.5139 | 1.5066 |

Figure 3B:
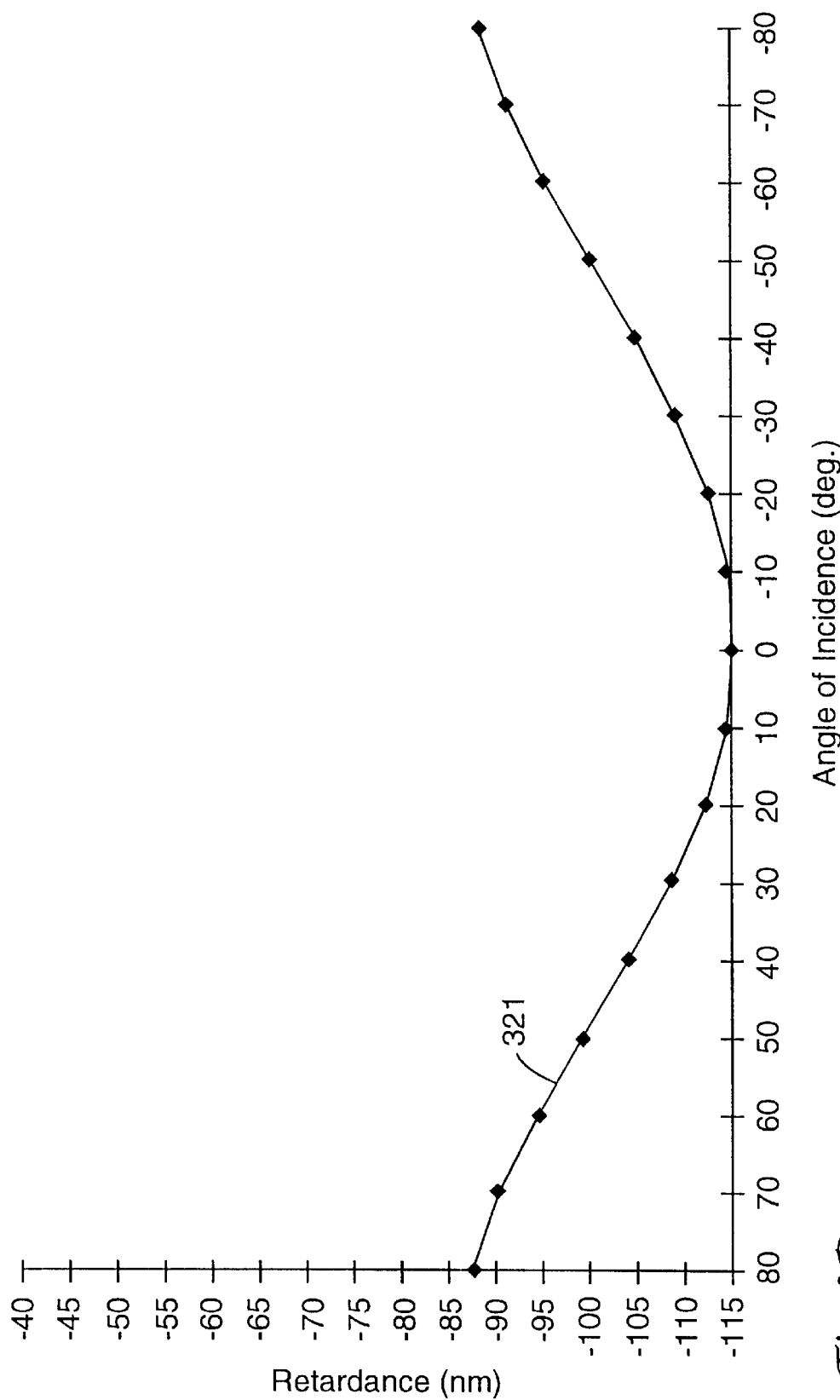
Figure 3C:
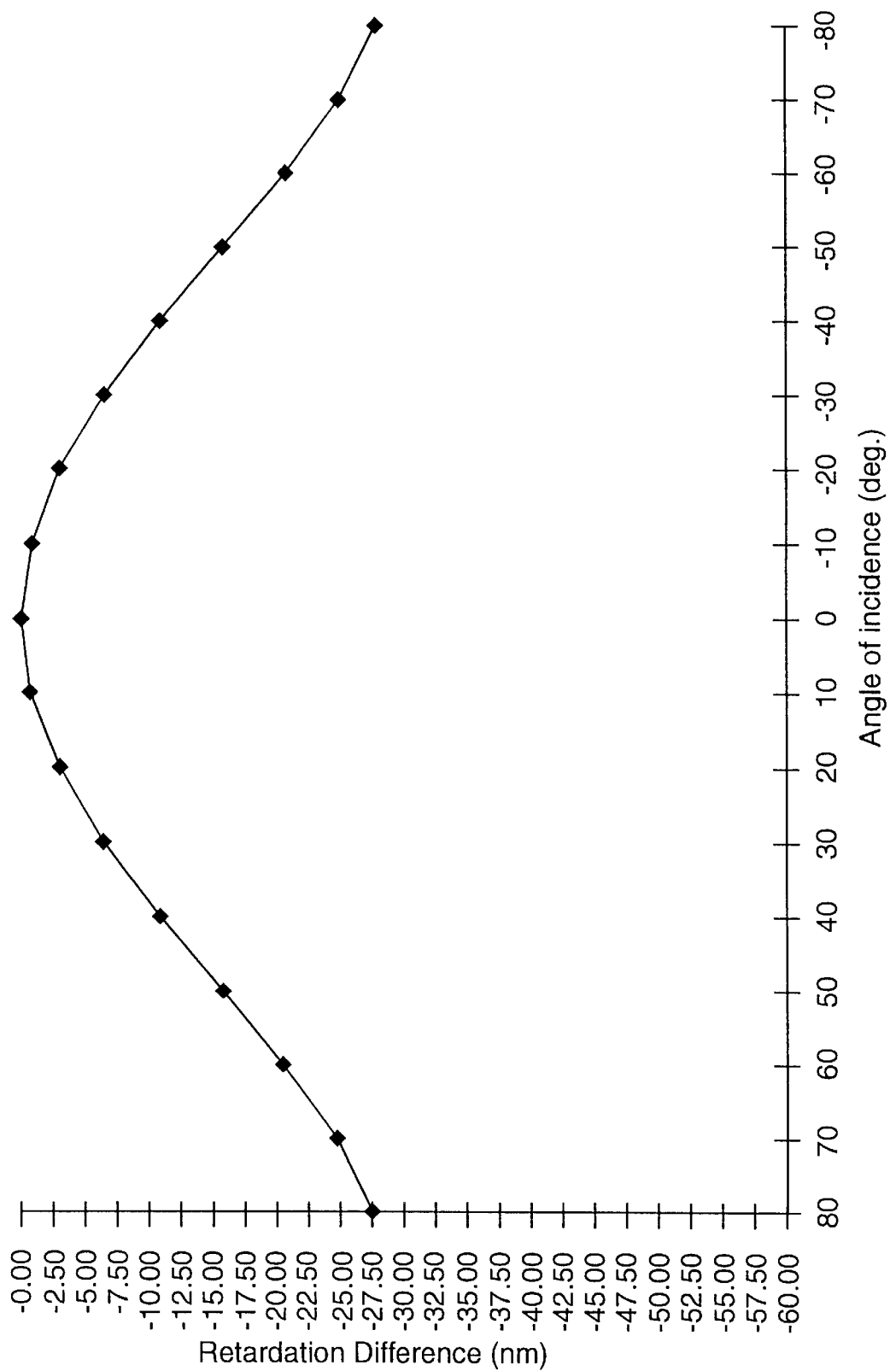

FIG. 3A illustrate a Table which lists the retardation values (nm) 303 for light of 550 nm incident on the film at various angles 301. FIG. 3A also lists the difference in retardation (nm) 305 as the incident light moves from normal incidence. FIG. 3A further lists the retardation at off-normal angles of incidence as a percentage 307 of retardation values at normal angle incidence. FIG. 3B illustrates a plot of the retardation values (nm) 311 as a function of the angle of incidence. FIG. 3C illustrates the retardation difference (nm) as a function of angle. As illustrated in these Figures, the off-normal performance of the acrylonitrile based retarder is relatively uniform compared to other single film retarders making the retarder well suited for a number of applications where uniform retardation is required for a wide range of incidence angles.

Figure 4B:
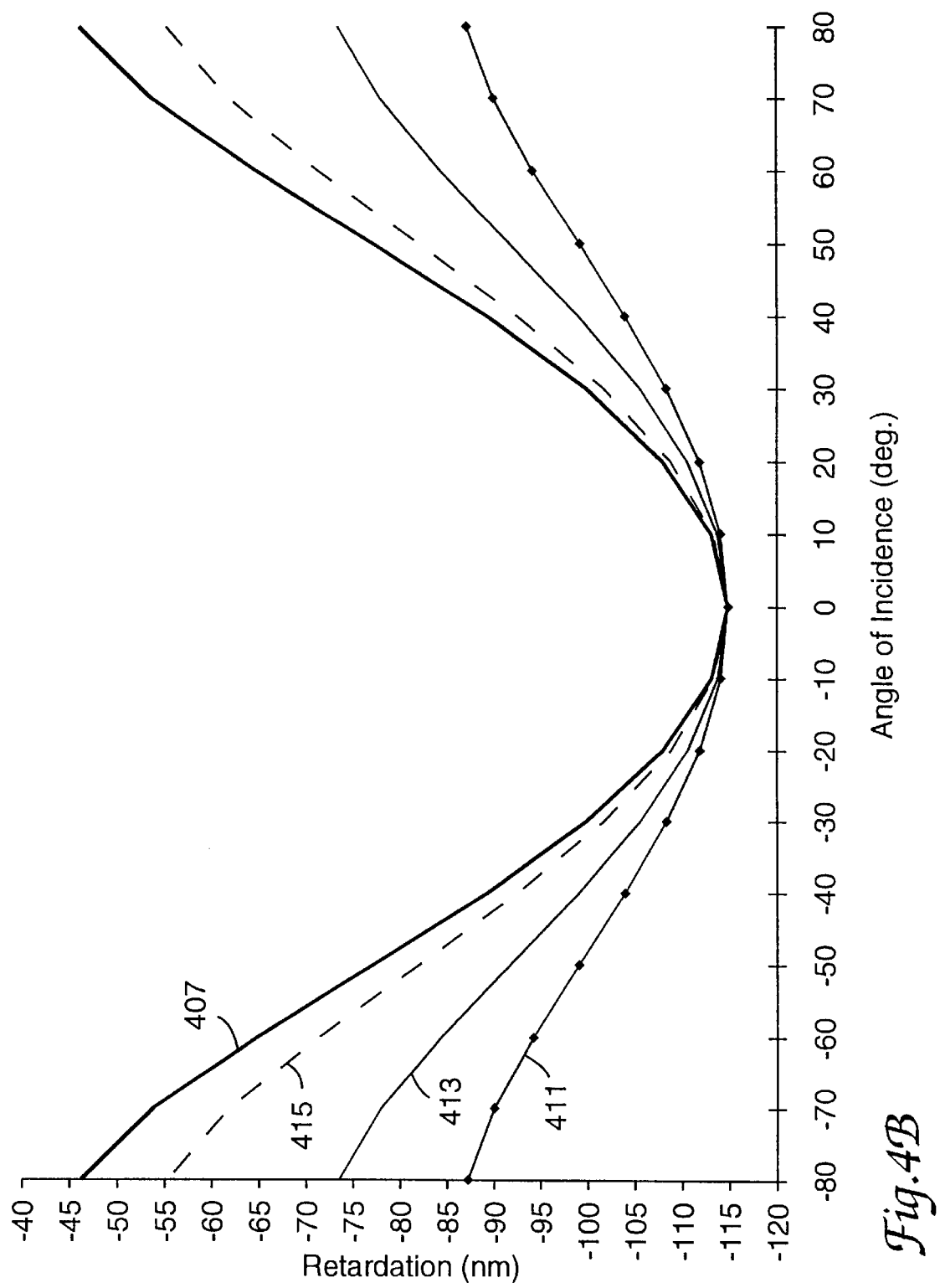

As noted above, improved off-normal performance of the acrylonitrile-based retarder results from the matching of the $n_y$ and $n_z$ refractive indices. FIGS. 4A–4B illustrates how an increase in the difference between $n_y$ and $n_z$ would impact the off-normal performance of the retarder. In FIG. 4A, the retardation values 401 of the acrylonitrile-based retarder, as a function of incidence angle, are illustrated for the retarder described in connection with FIGS. 3A–3C. Columns 403, 405, and 407, illustrate the off-normal performance of retarders having the same normal axis retardation values as the difference in refractive indices $n_y$ and $n_z$ increases from 0.0003 to 0.0009, respectively. The retardation at wide angles of incidence changes significantly.

As FIG. 4A illustrates, larger differences between $n_y$ and $n_z$ cause an increase in the drop in retardation at larger angles of incidence. In certain applications, it may be desirable that the overall retardation difference between normal incidence and incidence at 60° be less than about 20% (e.g., 20–30 nm) of the normal incidence retardation. This can be obtained using an acrylonitrile based retarder which has substantially equal $n_y$ and $n_z$ refractive indices. For example, as the above data illustrates, refractive indices equal to at least the fourth decimal places provide relatively uniform wide angle performance. FIG. 4B plots a comparison of the off-normal retardation 411 of the above film with the those calculated from the refractive indices.

As illustrated by the data in FIGS. 4A and 4B, even slight variations in $n_y$ and $n_z$ can significantly impact the off-normal performance of the retarder. This reinforces the particular suitability of the acrylonitrile-based optical retarders, particularly such retarders used in applications where uniform, wide-angle performance is desired. Moreover, such retarders can be fabricated using a process which permits production of relatively large retarders having uniform thickness and optical characteristics and which is relatively simple.

While in the above examples, a butadiene elastomeric toughening material is added to the acrylonitrile-based retarder, it will be appreciated that other acrylonitrile-based retarders will have similar desirable optical properties. In general, other suitable materials may be added to the retarder, so long as the materials do not significantly impact the optical performance of the retarder. For example, isoprene based rubbers, natural rubbers and the like could be used.

As noted above, acrylonitrile based retarders are particularly suited for applications requiring relatively uniform retardation over a wide range of incidence angles. More particular embodiments of the invention are described below in such applications.

Figure 5A:
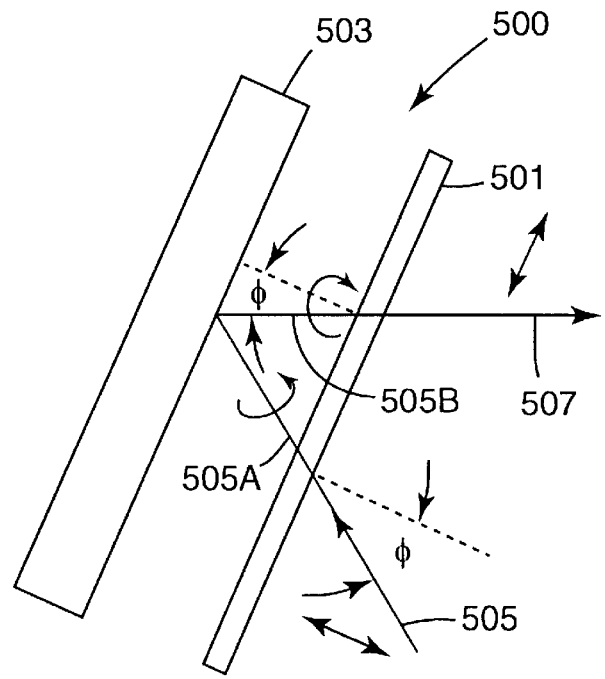
FIGS. 5A–5B illustrate a particular application of an optical retarder in accordance with one embodiment of the invention.

In accordance with one embodiment of the invention, the acrylonitrile based retarder is used as the basis of a retarder or polarization rotating mirror. By way of example, without intending to be limited to the example, a particular ¼-wave mirror will be described. The ¼-wave mirror is used to rotate the polarization direction of linearly polarize light, reflected from the mirror, by 90°. One particular ¼-wave mirror arrangement 500 is illustrated in FIG. 5A. An acrylonitrile based retarder 501 is disposed in a plane parallel to the reflecting surface of a mirror 503. A light source directs linearly polarized light 505 to the mirror at an incidence angle $\phi$. The retarder 501 is oriented relative to the incident light such that light incident on the retarder at an angle normal to its surface (i.e., $\phi=0$) is retarded by one quarter of its wavelength. In this construction, the linearly polarized light 505 is converted to circularly polarized light 505A, with a first rotation direction, as it passes through the retarder 501.

The circularly polarized light 505A reflects off the surface of the mirror 503. Light 505B reflected by mirror 503 is circularly polarized with an opposite rotation direction. The reflected light is directed back onto retarder 501 at an angle $\phi$. As the reflected circularly polarized light 505B passes through the retarder 501 a second time, another ¼-wave phase difference is introduced converting the circularly polarized light 505B into linearly polarized light 507. The polarization direction of the reflected linearly polarized light 507 is substantially orthogonal to the initial polarization direction of the incident light 505.

As will be appreciated, the above-description assumes normal incidence and precise ¼-wave delays for each pass through the retarder 501. As the angle of incidence $\phi$ varies from normal, the relative phase shift will be impacted as a result of off-normal retardation deviations of the retarder 501. Thus, as the linearly polarized light 505 passes through the retarder at higher angles of incidence, the ellipticity introduced into the polarized light by the retarder 501 increases. As off-normal incident light is reflected, it also passes back through the retarder at an incidence angle $\phi$, assuming a substantially flat mirror. The ellipticity introduced by the off-normal retardation difference will add to the ellipticity introduced by the first pass.

As the above discussion illustrates, the initial linearly polarized light 505 passes through the retarder twice. An ellipticity introduced into the polarized light 507 reflected from the ¼-wave mirror 500 will vary with the angle of incidence. Such ellipticity tends to degrade performance of those applications which rely on the linear polarization state of the reflected light. Accordingly, in applications using ¼-wave mirrors and relatively wide angles of incidence, it is desirable to minimize the off-normal retardation difference so that the reflected light will be substantially linearly polarized, with the direction of polarization being rotated by 90°.

As will be appreciated from the above description, a ¼-wave mirror 500 constructed with an acrylonitrile based retarder provides relatively uniform off-normal performance in a form which can be constructed at relatively low cost and complexity. The construction allows rotation of the polarization direction of linearly polarized light without introducing substantial ellipiticity to the rotated linearly polarized light at relatively high angles of incidence. In general, it is desirable that any deviation from an ellipticity of 0 introduced at off-normal angles of incidence, be less than about 10%. It is more preferable that the deviations be less than about 5%. In certain incidences, it is necessary that the ellipiticity be less than 1% for all angles of incidence. As will be appreciated from the above description of the acrylonitrile based retarder, the above results can be obtained due to the particular wide-angle optical performance of the retarder.

Figure 5B:
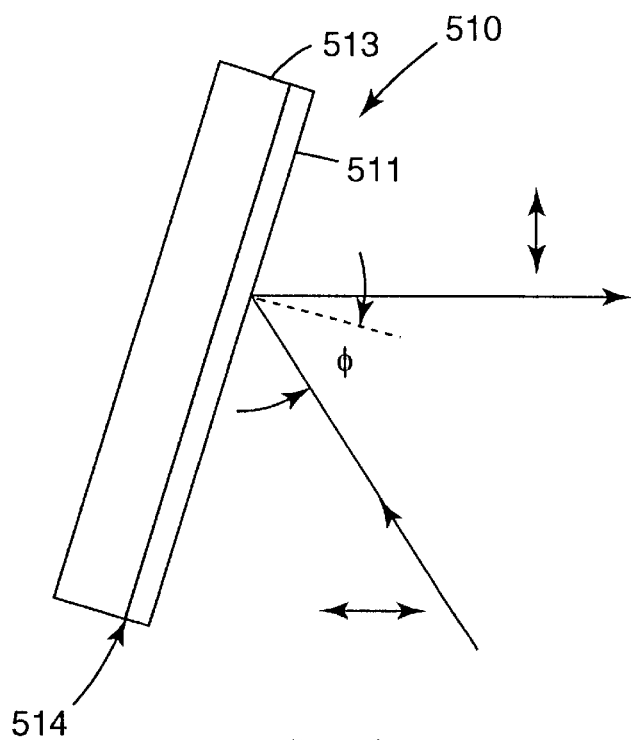

In FIG. 5A, the retarder 501 is illustrated as being separate from the mirror 503. In FIG. 5B, another embodiment of retarding mirror 510 is illustrated in which an acrylonitrile based retarder 511 is laminated or otherwise affixed to a mirror 513 by an adhesive 514. The optical performance of the mirror arrangement is generally the same as that described above in connection with FIG. 5A. Consideration, however, should be given to any additional components introduced by the construction. For example, lamination defects, refractive indices of adhesives, and the like must be considered.

Figure 6:
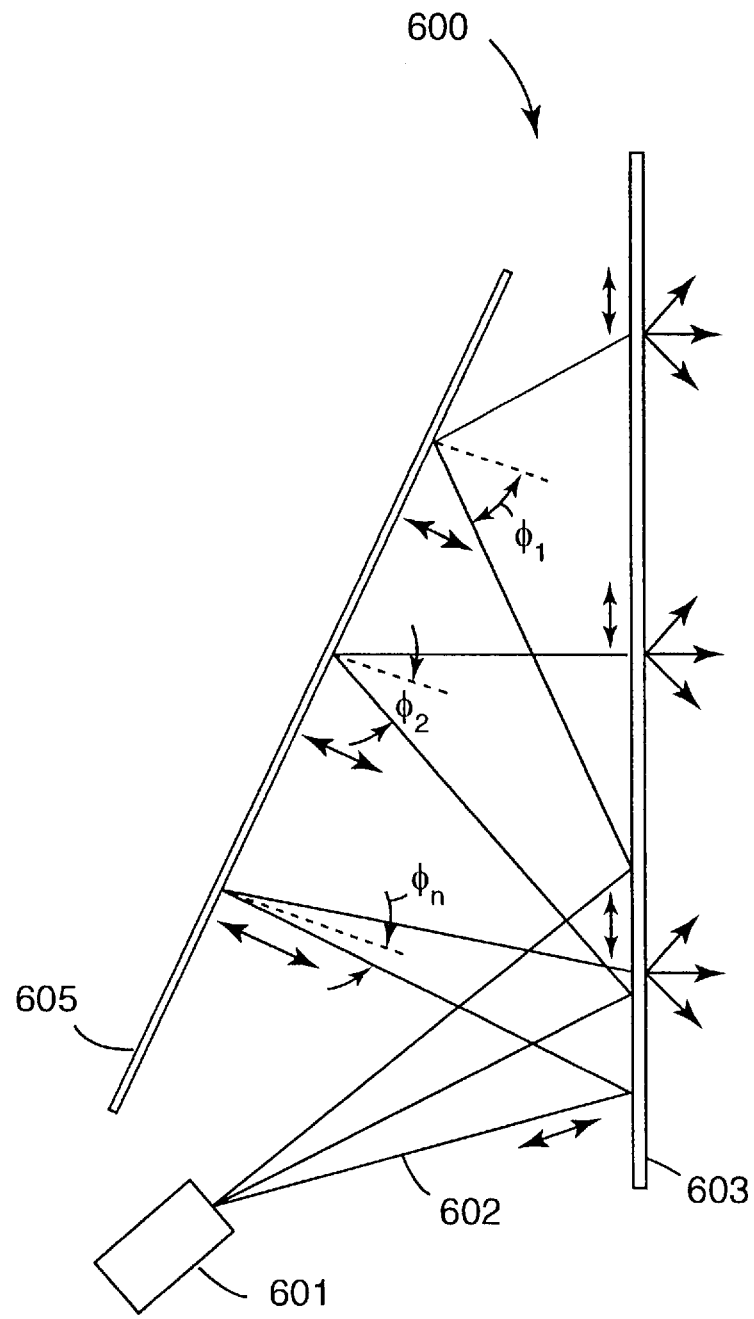
FIG. 6 illustrates another particular application of an optical retarder in accordance with one embodiment of the invention.

An optical system incorporating a retarder mirror, of the type illustrated in FIGS. 5A and 5B, for example, is illustrated in FIG. 6, The optical system of FIG. 6 is a projection display system 600 incorporating a folded light path. The general operation of the folded path projection display system is illustrated in FIG. 6. As will be described more fully below, the projection system 600 incorporates an acrylonitrile based ¼-wave retarder/mirror arrangement 605 as a key element which must operate over a large range of incidence angles. The operation of the display system 600 also requires that light reflected by the ¼-wave retarder/mirror arrangement 605 be highly linearly polarized (e.g., exhibit minimal ellipticity). For a more detailed description of such systems, reference may be made to U.S. Pat. No. 5,557,343, entitled Optical System Including a Reflective Polarizer for a Rear Projection Picture Display Apparatus, and Published European Application EP 0,783,133 entitled Projecting Images.

In the optical system of FIG. 6, light, representative of an image to be displayed, is projected from an image source 601 onto a screen assembly 603. The light 602 from the source 601 is linearly polarized in a first direction. The rear surface of the screen assembly 603 includes a reflective polarizer. Reflective polarizing films are available from Minnesota Mining and Manufacturing Company under the name of the Dual Brightness Enhancement Film (DBEF). Other reflective polarizing films are described in U.S. patent applications Ser. No. 08/402,041, filed Mar. 10, 1995 and entitled Optical Film, and Ser. No. 08/610,092, filed Feb. 29, 1996, entitled An Optical Film, the contents of which are incorporated herein by reference.

The reflective polarizer of the screen assembly reflects light of one particular linear polarization and transmits light of an opposite (orthogonal) linear polarization. The orientation of the reflective polarizer and the polarization direction of light initially incident on the reflective polarizer are such that the incident light is initially reflected by the reflective polarizer toward the acrylonitrile based retarding mirror assembly 605. The retarding mirror assembly 605 may be of the type illustrated in FIGS. 5A and 5B and serves to rotate the polarization direction of the linearly polarized light by 90°.

In operation, linearly polarized light reflects from the reflective polarizer and is incident on the retarding mirror 605. The light is reflected and the polarization direction is rotated by 90° such that the polarization direction now aligns with the pass direction of the reflective polarizer. Thus, the light passes through the screen assembly 603 for viewing. It is desirable that all of the light pass through the screen to increase viewing brightness. Any ellipticity in the light, however, will reduce the amount of light passing through the screen since the component of light still aligned in the direction of the original polarization will be reflected by the screen.

As will be appreciated from the optical geometry illustrated in FIG. 6, light will be incident upon the retarder mirror 605 over a large range of incidence angles $\phi_1, \phi_2, \ldots \phi_n$. In such an application, the maximum angle of incidence may be quite high. As noted above, any ellipticity introduced into the light reflected from the retarder mirror 605 will degrade the overall performance of the display device. In the projecting device illustrated in FIG. 6, the retarder mirror 605 is formed of an acrylonitrile based retarder so as to minimizes the ellipticity introduced into the reflected light as angles of incidence vary. It is generally desirable, that deviations from an ellipiticity of zero in such a system be less than 5%. It is more preferable, in certain instances to have the ellipticity be even less than 1%. While the above discussion assumes an ellipticity of zero at normal angles of incidence, the preferred percentages for maximum ellipticity are appropriate if light incident on the retarder mirror at normal angles of incidence also reflects from the retarder mirror with some ellipticity.

The acrylonitrile based retarders described above can be incorporated into a retarding mirror exhibiting ellipticity variation within the above tolerances. Thus, the projection device, incorporating an acrylonitrile based retarder mirror, will have improved performance over many typical retarders and can be manufactured relatively inexpensively. Moreover, an acrylonitrile retarder manufactured as described above, is well suited for lamination to mirror surfaces and other substrates.

Figure 7:
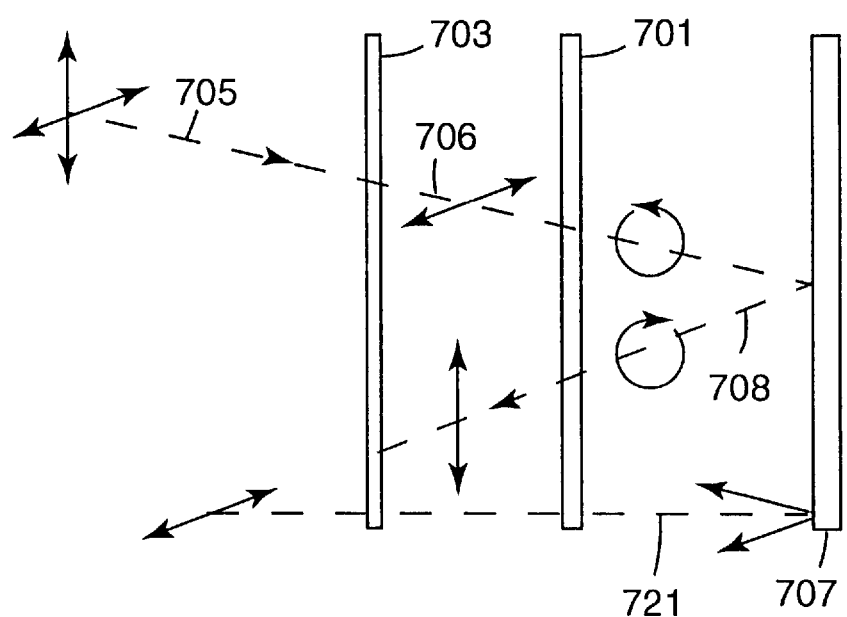
FIG. 7 illustrates still another particular application of an optical retarder in accordance with one embodiment of the invention.

FIG. 7 illustrates an optical construction in accordance with still another particular embodiment of the invention. In the embodiment of FIG. 7, an acrylonitrile based retarder 701 is incorporated into an anti-glare optical construction. The anti-glare optical construction includes an absorptive polarizer 703, such as a dichroic polarizer, for example. The polarizer 703 linearly polarizes unpolarized light 705 incident on the polarizer. The acrylonitrile based retarder 701 is oriented relative to the absorbtive polarizer to convert the linearly polarized light 706 to circularly polarized light having a first rotation direction. If the circularly polarized light is reflected off the surface of an optical element 707, which is protected by the anti-glare construction, the light is reflected as circularly polarized light rotating in the opposite direction. The circularly polarized light 708 passes back through the retarder 701. Thus, as in the case of the retarding mirror above, the polarization direction of the light is now rotated by 90°. The light, rotated by 90°, strikes the absorptive polarizer, this time linearly polarized in a direction of the absorption, to thereby inhibit or prevent light reflected from the surface of the optical element 707 from exiting the antiglare construction.

The optical element 707 may be any type of reflective surface where it is desirable to reduce glare. For example, it may be the screen of a computer monitor. In such an application, the polarizer 703 and acrylonitrile based retarder 701 can be affixed or otherwise positioned in front of the monitor in any of a variety of ways conventionally known. As will be appreciated, when the optical element 707 is a monitor, light 721 exiting the monitor will pass through the acrylonitrile based retarder 701 and will be polarized by the absorptive polarizer 703.

As in the above description of the retarder mirror, the off-normal performance of the acrylonitrile based retarder is important to ensure that light which is reflected from the optical element 707 is correctly polarized to be absorbed by the absorptive polarizer 703 upon reflection. Further, it will be appreciated that relatively large angles of incidence $\phi$ may be seen by the anti-reflective optical construction. For example, computer monitors are often used in environments where light sources causing reflection and glare are positioned at an angle relatively oblique with respect to the monitor. Thus, improved wide-angle performance of the retarder, serves to further reduce or eliminate the glare or reflection from the optical element 707 being protected.

In one embodiment, the surface of the absorptive polarizer 703 facing the incident light may be A/R coated to reduce any reflection from the polarizer. The absorptive polarizer 703 may also be laminated or otherwise affixed to a substrate such as glass or other films. The substrate may also be A/R coated. The ¼-wave film 701 may also be affixed by lamination or otherwise to a substrate. In certain instances this may be the same substrate to which the polarizer is affixed. The various elements may be laminated between glass. One or more of the glass surfaces may also be A/R coated.

As noted above, the present invention is applicable to a number of optical retarders. It is believed to be particularly useful in applications where light is incident on the retarder over a wide range of angles. Accordingly, the present invention should not be considered limited to the particular examples described above, but rather should be understood to cover all aspects of the invention as fairly set out in the attached claims.

What is claimed is:

1. An optical retarder for uniformly retarding visible light incident on the retarder over a relatively wide range of incidence angles varying from an angle normal to a plane of the retarder to a maximum angle $\phi_{max}$ of at least about 30 degrees, the optical retarder comprising:

a substrate;
   a film of an acrylonitrile based polymer and elastomeric copolymer disposed on the substrate, the film having a retardation magnitude $\delta$ which may be expressed by the relationship $$\delta = d \left[ \frac{n_x}{n_z} (n_z^2 - (\sin(\phi))^2)^{1/2} - (n_y^2 - (\sin(\phi))^2)^{1/2} \right],$$

where $n_x$ and $n_y$ are refractive indices of the film for light at a wavelength of interest polarized along orthogonal in-plane axes x and y of the film, d is a thickness of the film in a direction of a z axis mutually orthogonal to the x and y in-plane axis, $n_z$ is a refractive index of the film for light at the wavelength of interest polarized along the z axis, and φ is the angle of incidence in the x-z plane, wherein the magnitude of retardation δ of the film varies by less than about 25% of the magnitude of retardation at normal incidence as the angle of incidence φ of light at the wavelength of interest varies from normal to the maximum angle $\phi_{max}$.

2. An optical retarder as recited in claim 1, wherein the substrate comprises a mirror.

3. An optical retarder as recited in claim 2, wherein the magnitude of retardation δ of the film at normal angles of incidence ranges from about 110 nm to about 150 nm.

4. An optical retarder as recited in claim 1, wherein the substrate comprises glass.

5. An optical retarder as recited in claim 1, wherein the substrate comprises a polymeric film.

6. An optical retarder as recited in claim 5, wherein the polymeric film is isotropic.

7. An optical retarder as recited in claim 5, wherein the polymeric film is birefringent.

8. A retarder as recited in claim 1, wherein the maximum angle $\phi_{max}$ is at least 50 degrees.

9. A retarder as recited in claim 8, wherein the magnitude of retardation δ varies by less than about 15% of the magnitude of normal incidence retardation over the range of incidence angles.

10. A retarder as recited in claim 8, wherein the maximum angle $\phi_{max}$ is at least 60 degrees.

11. A retarder as recited in claim 1, wherein the magnitude of retardation δ varies by less than about 6% of the magnitude of normal incidence retardation over the range of incidence angles.

12. A retarder as recited in claim 1, wherein the acrylonitrile based copolymer comprises acrylonitrile copolymerized with a (meth)acrylate monomer or monomers.

13. A retarder as recited in claim 12, wherein the (meth)acrylate monomer comprises a monomer selected from the group consisting of methyl acrylate, propyl acrylate, butyl acrylate, isooctyl acrylate, or 2-ethyl hexyl acrylate.

14. A retarder as recited in claim 12, wherein the (meth)acrylate monomer comprises methyl acrylate.

15. A retarder as recited in claim 14, wherein the elastomeric copolymer comprises butadiene copolymerized with acrylonitrile.

16. An optical retarder for use in retarding visible light incident on the retarder over a wide range of incidence angles varying from an angle normal to a plane of the retarder to a maximum angle $\phi_{max}$ of at least about 30 degrees, the optical retarder comprising:

a film comprised of blend of an acrylonitrile based polymer and an elastomeric copolymer, the film having an in-plane retardation magnitude $\delta_{in}$ which may be expressed by the relationship $$\delta_{in} = d(n_x - n_y),$$

where $n_x$ and $n_y$ are refractive indices of the film for light at a wavelength of interest polarized along orthogonal in-plane axes x and y of the film and d is a thickness of the film in a direction of a z axis mutually orthogonal to the x and y in-plane axis, the film further having an out-of-plane retardation magnitude $\delta_{out}$ which may be expressed by the relationship $$\delta_{out} = d\left[\frac{n_x}{n_z}(n_z^2 - (\sin(\phi))^2)^{1/2} - (n_y^2 - (\sin(\phi))^2)^{1/2}\right],$$

where $n_z$ is a refractive index of the film for light at the wavelength of interest polarized along the z axis, and φ is an out-of-plane angle of incidence in the x-z plane, wherein a retardation magnitude difference Δδ between the in-plane retardation $\delta_{in}$ and the out-of-plane retardation $\delta_{out}$ for light at the wavelength of interest incident on the film at the maximum angle $\phi_{max}$ is less than about 25% of the in-plane retardation $\delta_{in}$.

17. A retarder as recited in claim 16, wherein the maximum angle $\phi_{max}$ is at least 50 degrees.

18. A retarder as recited in claim 17, wherein the retardation magnitude difference Δδ is less than about 15% of the in-plane retardation $\delta_{in}$.

19. A retarder as recited in claim 16, wherein the maximum angle $\phi_{max}$ is at least 60 degrees.

20. A retarder as recited in claim 16, wherein the retardation magnitude difference Δδ is less than about 6% of the in-plane retardation $\delta_{in}$.

21. A retarding mirror for reflecting visible light, linearly polarized in an initial polarization direction, in a manner in which the reflected light is substantially linearly polarized in a direction orthogonal to the initial polarization direction, the light being incident on the retarder mirror at angles varying from an angle normal to a plane of the retarding mirror to a maximum angle $\phi_{max}$ of at least about 15 degrees, the retarding mirror comprising:

a substantially flat reflective substrate; and a stretched acrylonitrile based polymeric retardation film disposed parallel to the reflective substrate, the retardation film having a retardation magnitude δ which may be expressed by the relationship $$\delta = d\left[\frac{n_x}{n_z}(n_z^2 - (\sin(\phi))^2)^{1/2} - (n_y^2 - (\sin(\phi))^2)^{1/2}\right],$$

where $n_x$ and $n_y$ are refractive indices of the retardation film for light at a wavelength of interest polarized along orthogonal in-plane axes x and y of the film, d is a thickness of the retardation film in a direction of a z axis mutually orthogonal to the x and y in-plane axis, $n_z$ is a refractive index of the retardation film for light at the wavelength of interest polarized along the z axis, and φ represents an angle in the x-z plane at which the light is incident on the retarding mirror, wherein an ellipticity introduced by the retarding mirror of reflected light at the wavelength of interest which is incident on the retarding mirror at the maximum angle $\phi_{max}$ is within 25% of an ellipticity of the reflected light at the wavelength of interest incident on the retarding mirror at an angle normal to the surface of the retarding mirror.

22. An anti-reflective (AR) optical element disposed on a partially reflective surface and effective over a relatively wide range of incidence angles to substantially reduce reflection of visible light from the surface, the AR optical element comprising:

an absorptive polarizer disposed between a source of incident light and the reflective surface; and a retarder comprised of an acrylonitrile based polymer film, positioned between the polarizer and the reflective surface, the retarder receiving polarized light transmitted by the polarizer and retarding the polarized light by a retardation magnitude $\delta$ which may be expressed by the relationship $$\delta = d \left[ \frac{n_x}{n_z} (n_z^2 - (\sin(\phi))^2)^{1/2} - (n_y^2 - (\sin(\phi))^2)^{1/2} \right],$$

where $n_x$ and $n_y$ are refractive indices of the film for light at a wavelength of interest polarized along orthogonal in-plane axes x and y of the film, d is a thickness of the film in a direction of a z axis mutually orthogonal to the x and y in-plane axis, $n_z$ is a refractive index of the film for light at the wavelength of interest polarized along the z axis, and $\phi$ represents an angle in the x-z plane at which the light is transmitted from the polarizer to the film, wherein a retardation magnitude $\delta_{\phi=0°}$ for light at the wavelength of interest incident on the blended film at an angle normal to a surface of the blended film is within 15% of a retardation magnitude $\delta_{\phi max}$ for light at the wavelength of interest incident on the film at a maximum angle of incidence of at least about 30°, measured from normal incidence.

* * * * *

UNITED STATES PATENT AND TRADEMARK OFFICE
CERTIFICATE OF CORRECTION

PATENT NO.: 5,867,239

DATED: February 2, 1999

INVENTOR(S): Hassan Sahouani, Sundaravel Damodaran, Gary T. Boyd, Ramesh C. Kumar It is certified that error appears in the above-identified patent and that said Letters Patent is hereby corrected as shown below:

Claim 22, line 5, delete "blended film" and insert therefore -- retarder--.

Claim 22, line 6, delete "blended film" and insert therefore --retarder--.

Claim 22, line 8, delete "film" and insert therefore --retarder--.

Signed and Sealed this

Thirtieth Day of May, 2000

Attest:

Attesting Officer

Q. TODD DICKINSON

Director of Patents and Trademarks